United States Patent [19]

Damman et al.

[11] Patent Number: 4,673,016

[45] Date of Patent: Jun. 16, 1987

[54] METHOD AND APPARATUS FOR LAYING A PNEUMATIC TIRE AROUND A WHEEL RIM

[75] Inventors: Cornelis C. Damman; Jacob Plaatsman, both of Diemen, Netherlands

[73] Assignee: Holland Mechanics B.V., Purmerend, Netherlands

[21] Appl. No.: 776,743

[22] Filed: Sep. 16, 1985

[30] Foreign Application Priority Data

Sep. 17, 1984 [NL] Netherlands ............................ 8402851

[51] Int. Cl.⁴ ............................................. B60C 25/08
[52] U.S. Cl. ....................................... 157/1.24; 157/1; 157/1.28
[58] Field of Search ................ 157/1, 1.17, 1.24, 1.21, 157/1.22, 1.26, 1.28, 1.2

[56] References Cited

U.S. PATENT DOCUMENTS 3,086,578  4/1963  Breazeale et al. .................. 157/1.24
3,612,140  10/1971 Malinski ............................ 157/1.17
4,262,727  4/1981  Schifferly ........................... 157/1.24

Primary Examiner—Frederick R. Schmidt
Assistant Examiner—Debra S. Meislin
Attorney, Agent, or Firm—Pahl, Lorusso & Loud

[57] ABSTRACT

The invention relates to a method for laying a pneumatic tire around a wheel rim by a mounting unit which is moved along the wheel rim.

According to the invention at least one pair of mounting units is moved with equal speeds along the wheel rim in opposite directions through angles, which together form an angle of substantially 360°.

The invention further relates to an apparatus for laying a pneumatic tire around a wheel rim using the method wherein a mounting unit is movable along the wheel rim.

According to the invention at least one pair of mounting units is provided, which are movable with equal speeds in opposite directions along the wheel rim and which together cover an angle of substantially 360°.

15 Claims, 8 Drawing Figures

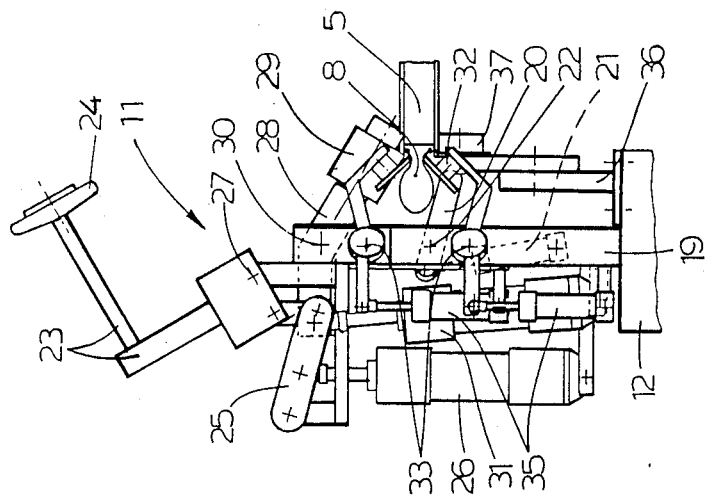
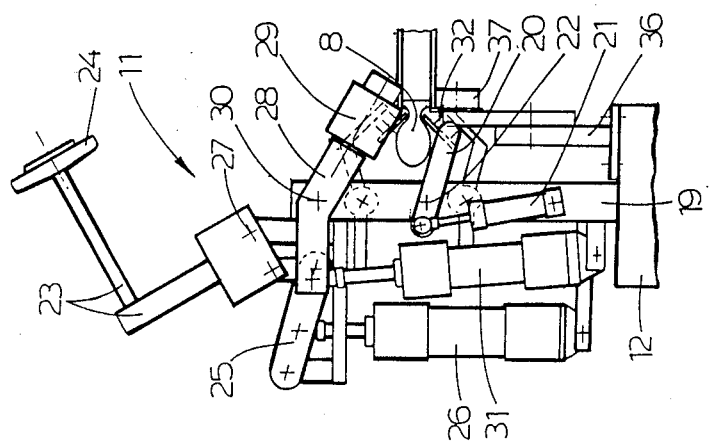
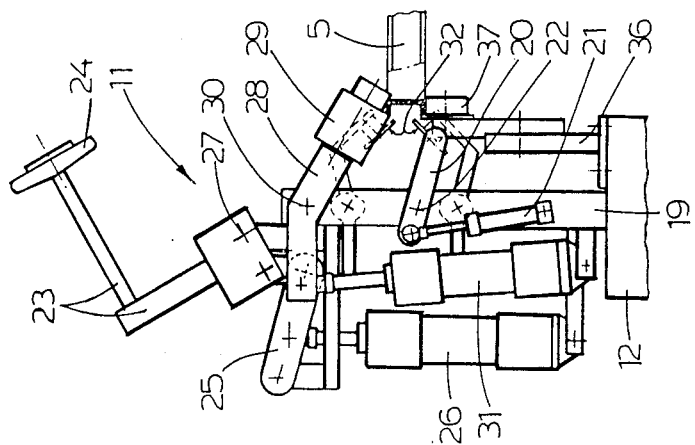

METHOD AND APPARATUS FOR LAYING A PNEUMATIC TIRE AROUND A WHEEL RIM

The invention relates to a method for laying a pneumatic tire around a wheel rim by means of a mounting unit which is moved along the wheel rim; as well as to an apparatus for laying a pneumatic tire around a wheel rim using this method.

Such a method for laying a pneumatic tire around a wheel rim is already known, wherein a single mounting unit is moved along substantially the whole circumference of the wheel rim. During this movement, a great circumferential force is exerted by the mounting unit on the wheel rim as well as on the pneumatic tire. Hereby, on the one hand, the wheel rim tends to rotate about its axis, so that this wheel rim has to be clamped in all directions, whilst, on the other hand, the pneumatic tire tends to rotate with respect to the wheel rim, whereby a force is exerted on the valve giving rise to the danger of the valve being pulled to a slanting position.

In the first place, it is an object of the present invention to provide a method for laying a pneumatic tire around a wheel rim, wherein the above disadvantages are removed in an efficient way.

For this purpose, the method for laying a pneumatic tire around a wheel rim is characterized in that at least one pair of mounting units is moved with equal speeds along the wheel rim in opposite directions through angles, which together form an angle of substantially 360°.

When this method is used the component of the resulting force of the mounting units, which extend in the plane of the wheel rim, is directed through the axis of rotation of the wheel rim, so that this force does not cause a rotation of the wheel rim. Therefore, the wheel rim does not have to be clamped in all directions, since axial and radial fixations will already be sufficient. For the same reason, the pneumatic tire will not rotate with respect to the wheel rim, so that no force is exerted on the valve and the tire in its applied condition will lie in a better centred position in the wheel rim.

A favourable embodiment of the invention is characterized in that after the inner bead of the tire has been laid around the wheel rim sliding members of a pinching-sliding means of each mounting unit are brought into engagement with the tire whereby the outer bead of the tire is locally urged over the adjacent rim edge, whereupon an outer bead roll of each mounting unit is placed against this rim edge, and subsequently the mounting units are moved along the wheel rim, whereby the remaining portions of the outer bead are urged over the adjacent rim edge by the outer bead rolls rolling over the said rim edge, while the tire is stressed in circumferential direction because of a braking action, which is exerted on the tire by the sliding members, while the tire is also urged together and laid in the rim bed by the sliding members.

This has the advantage of considerably reducing tire damage when the last portion of the outer bead is laid around the wheel rim, whilst, furthermore, permitting even very tight tires to be laid around the wheel rim.

It is noted that in the present description, in the non assembled condition of the tire to be laid around the wheel rim, the bead which is adjacent to the wheel rim is called the inner bead, and the bead which lies further away from the wheel rim is indicated as the outer bead.

According to an advantageous embodiment of the method according to the invention the assembled tire is inflated, whereupon tire centering rolls are brought into contact with the opposite flanks of the tire, whereafter the wheel rim is rotated for at least one turn in each way, the tire centering rolls with respect to the tire are positioned in such manner that, during the rotation in one way, a friction force with an outwardly directed radial component is exerted on the tire by the tire centering rolls, whereby the tire is slightly pulled out of the wheel rim, and, during the rotation in the other way, a friction force with an inwardly directed radial component is exerted on the tire by the tire centering rolls, whereby the tire is urged into the wheel rim.

In this way, the tire will be laid straightly in the wheel rim, whereby a wobbling action of the tire in the wheel rim is avoided.

Furthermore, it is proposed according to the invention that prior to the step of laying the outer bead of the tire around the wheel rim, this outer bead is pushed away from the adjacent rim edge, whereby a space is created between the outer bead and the adjacent rim edge, whereupon an inner bead roll of each mounting unit is partly brought into the interior of the tire and is pushed against the rim edge lying adjacent to the inner bead of the tire, whereafter the mounting units are removed along the wheel rim, and the inner bead is urged over the adjacent rim edge.

This step, which until now had to be done by hand, can be carried out automatically in this embodiment, whereby a substantial saving of time is obtained.

The invention further relates to an apparatus for laying a pneumatic tire around a wheel rim using the above method, wherein a mounting unit is movable along the wheel rim.

According to the invention, this apparatus is characterized in that at least one pair of mounting units is provided, which are movable with equal speeds in opposite directions along the wheel rim and which together cover an angle of substantially 360°.

The invention will hereafter be elucidated with reference to the drawings, which show an embodiment of the apparatus for laying a pneumatic tire around a wheel rim according to the invention.

FIG. 5 is a section on the line V—V in FIG. 1, on a bigger scale.

FIG. 6 shows the section of FIG. 5 with the pneumatic tire in the applied condition.

FIG. 7 is a section on the line VII—VII in FIG. 1, on a bigger scale.

Figure 4:
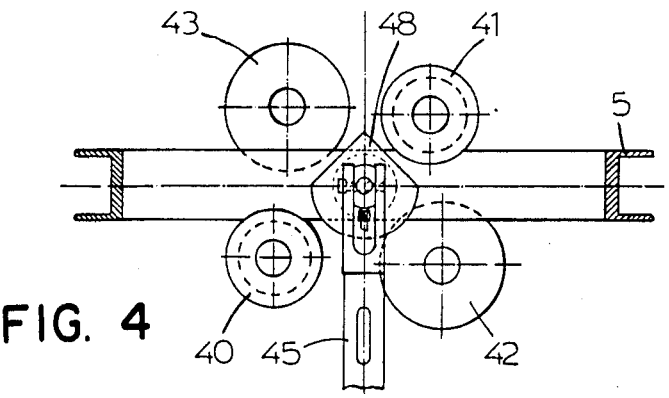
FIG. 4 is a section on the line IV—IV in FIG. 1, on a bigger scale.

The drawing shows, by way of example, an embodiment of the apparatus according to the invention for laying a pneumatic tire around a wheel rim, which is provided with a table 1 carrying the several parts of the apparatus. On this apparatus, a spoke wheel 2 may be placed, the wheel 2 having a shaft 3, a wheel rim 5 provided with a valve hole 4, an inner tube with a valve, and an outer tire 8.

When the outer tire 8 will be applied, the wheel 2 is put with its shaft 3 in a cavity of a hub support 9 so as to align the shaft 3 of the wheel 2 with a central axis 10 of the apparatus.

Of both wire reinforced beads of the outer tire 8, which have to be laid around the wheel rim 5, in the not applied condition of the tire, the bead which is adjacent to the wheel rim 5 is called the inner bead, whilst the bead which lies further away from the wheel rim 5 is designated the outer bead as already stated hereinbefore. In the situation as shown in the drawings, in which the outer tire 8 in its not applied state lies on the wheel rim 5, the outer bead lies above the inner bead and both beads have to be brought over the adjacent rim edge of the wheel rim 5, which, in the embodiment represented in the drawings, is the upper rim edge. The inner bead of the outer tire 8 is always the first one to be laid around the wheel rim 5.

At the circumference of the wheel 2 supported on the apparatus, two mounting units 11 which are of similar built mirror-imaged design are each mounted on their own platform 12 at the outer end of a respective arm 13. These arms 13 are rotatable about the central axis 10 by a drive means 14.

Figure 2:
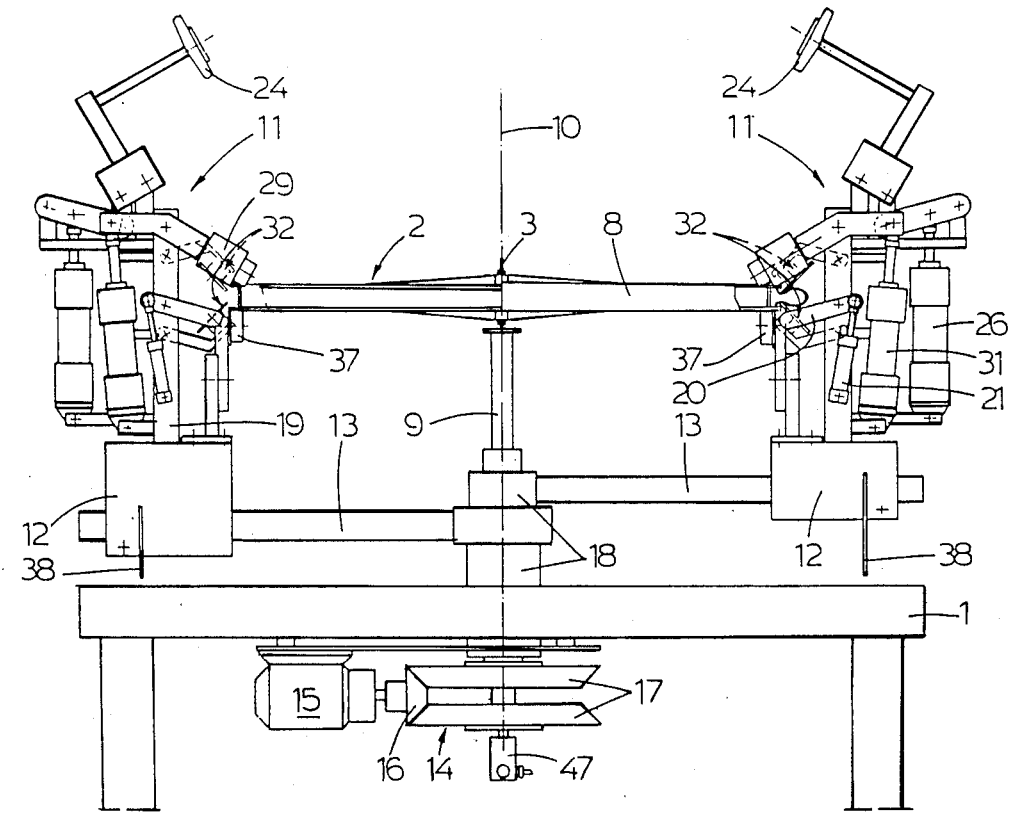
FIG. 2 is a front view of FIG. 1.
Figure 8:
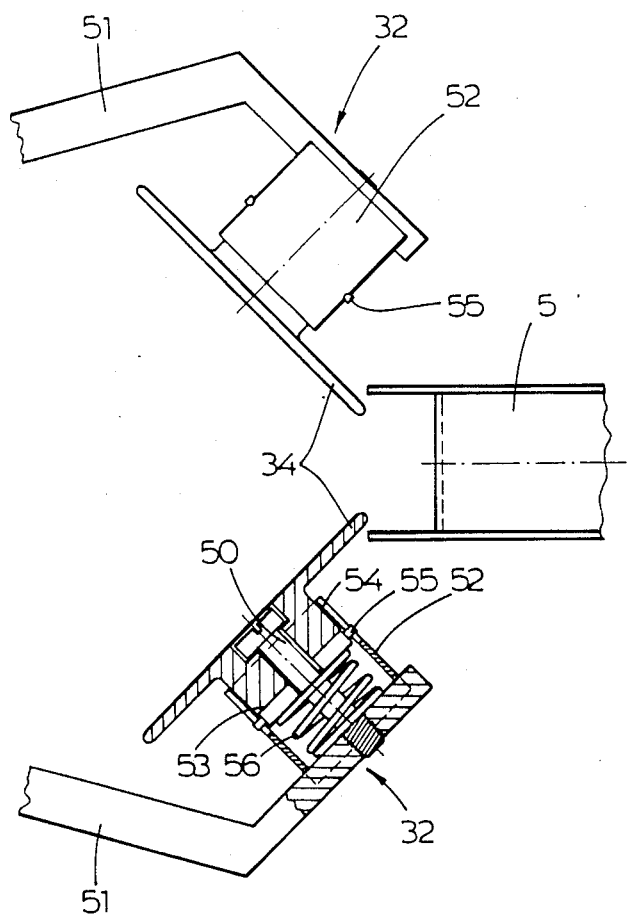
FIG. 8 is an enlarged detail of FIG. 2, which partially in section shows the pinching-sliding means.

This drive means 14 is shown in FIG. 2 and comprises a motor 15, preferably an electric motor, of which the output shaft is provided with a bevel pinion gear 16, which is in engagement with two similar crown gears 17, which are rotatable in opposite directions and which are each connected to the respective arm 13 by means of a hollow shaft 18.

Because the crown gears 17 are similar they will rotate with the same speed of revolution in opposite directions, so that the mounting units 11, which are connected to the crown gears 17 are rotating with equal, but oppositely directed angular speeds.

Each mounting unit 11 is rotatable along an angle of substantially 180°, and both mounting units are adjacent to each other in their extreme positions.

FIG. 5–7 show a mounting unit separately. Each mounting unit 11 comprises parts, which in principle perform four functions, viz.:

a. lifting the outer tire 8, prior to laying the inner bead of the outer tire 8 around the wheel rim 5,
b. laying the inner bead of the outer tire around the wheel rim 5,
c. laying the outer bead of the outer tire around the wheel rim 5 and
d. stressing the pinching the outer tire 8 in the wheel rim 5 when the outer bead is being laid around the wheel rim 5.

These parts are connected substantially to the central support 19 of the mounting unit.

The parts of each mounting unit 11 which serve for lifting the outer tire 8 and (a) comprise a tire lifting arm 20 pivoting about a shaft 22 which is supported by the central support 19, the tire lifting arm 20 can be pressed with one end against the flank of the outer tire 8 which is adjacent to the inner bead, the tire lifting arm 20 being pivotably connected with its other end to a cylinder-rod assembly 21, which is hingedly connected to the central support 19.

The parts of each mounting unit 11, which serve for laying the inner bead around the wheel rim 5 and (b) comprise an inner bead roll 24 rotatably mounted on an arm 23. This arm 23 is rotatable about a shaft 27 having an axis perpendicular to the central axis 10 and which is supported by the central support 19 and this arm 23 is furthermore connected to a cylinder-rod assembly 26 with interposition of a linkage 25. The linkage 25 serves for enlarging the reach of adjustment of the cylinder-rod assembly 26 so as to make the arm 23 pivotable along a wider angle about the shaft 27 (compare FIGS. 2 and 3); the linkage 25 and the cylinder-rod assembly 26 are hingedly connected to the central support 19.

The parts of each mounting unit 11, which serve for laying the outer bead around the wheel rim 5 and (c) comprise an outer bead roll 29 which is rotatably mounted on an arm 28. This outer bead roll 29 consists of two cylindrical portions with different diameters, wherein the portion at the free end of the arm 28 has the smallest diameter. The arm 28 is pivotable about a shaft 30 having an axis perpendicular to the central axis 10 and which is supported by the central support 19, whilst the end of the arm 28 facing away from the outer bead roll 29 is hingedly connected to a cylinder-rod assembly 31.

The parts of each mounting unit 11, which serve for stressing and pinching the outer tire 8 in the wheel rim 5 and (d) comprise a pinching-sliding means consisting of two independently adjustable sliding members 32, which are pivotable about parallel shafts 33 supported on the central support 19, each of the shafts 33 having an axis perpendicular to the central axis 10.

For pivoting the sliding members 32 the end of each sliding member 32 facing away from the free end thereof is hingedly connected to a cylinder-rod assembly 35 which is pivotably mounted to the central support 19.

Each sliding member 32 comprises a wheel 34, which at its circumference can engage the respective flank of the outer tire 8.

The wheel 34 is rotatable about a screw 50, which is fixed to the free end of an arm 51, which is hingedly connected to the central support 19. A sleeve 52 is placed on the arm 51 concentrically about the screw 50. A portion of the wheel 34 is guided in the sleeve 52.

Furthermore, a brake lining 53 is slidable in the sleeve 52, but the brake lining 53 is locked against a rotation about the screw 50 by means of cams 55, which are provided on the brake lining and which are guided in axial slots 54 in the sleeve 52. A coil spring 56 is positioned between the brake lining 53 and the arm 51, the coil spring 56 urging the brake lining 53 against the adjacent surface of the wheel 54 to exert a braking action on the wheel 34.

Each mounting unit 11 further comprises a rim support roll 37 rotatably mounted on a support 36, the rim support roll 37 supporting the wheel rim 5 in the downwardly pivoted position of the inner bead roll 24 or of the outer bead roll 29.

All hinging parts mounted on the mounting unit pivot about shafts, with each of the shafts having an axis perpendicular to the central axis 10.

Under each mounting unit 11 a proximity switch 38 is provided, which is directed to the table 1 and which serves for switching off the drive motor 15 in particular positions of the mounting units 11. For this purpose, detection elements 39 are positioned on the table 1, the detection elements 39 causing the proximity switch 38 to give a pulse for stopping the drive motor 15, when the proximity switch 38 at a distance moves over one of the detection elements 39.

Each mounting unit 1 has to be stopped at three places, viz.: in a starting position (dot and dash line marked with SP), in an end position (dot and dash line marked with EP) and in a tire centering position (dot and dash line marked with CP). On the table, at the places which correspond with these positions, detection elements 39 are provided.

At the radially outer side of the wheel 2 supported on the apparatus and near one of the points of intersection of the mirror image plane of the mounting units 11 and the center of the rim bed of the wheel rim 5, four rotatable rolls 40, 41, 42, 43 (see FIG. 4) are provided:

a rim support roll 40 placed under the wheel rim 5 somewhat beside the said point of intersection, the rim support roll 40 supporting the wheel rim 5 and locating it in the radial direction.

a rim clamping roll 41 placed above the wheel rim 5 at the other side of the point of intersection and movable to and from the wheel rim 5 by means of a cylinder-rod assembly (not shown), a tire centering roll 42 which can engage the flank at the lower side of the outer tire 8.

a tire centering roll 43 which can engage the flank at the upperside of the outer tire 8 and which is movable to and from the tire by means of a cylinder-rod assembly (not shown).

The tire centering rolls 42, 43, respectively, are positioned in such manner that they each make a small angle to the tangent of the wheel rim 5, which tangent extends through the point of the wheel rim 5, which lies closest to the center of the respective tire centering roll 42, 43, respectively. The tire centering rolls 42 and 43 are driven by means of electric motors or the like (not shown).

Figure 1:
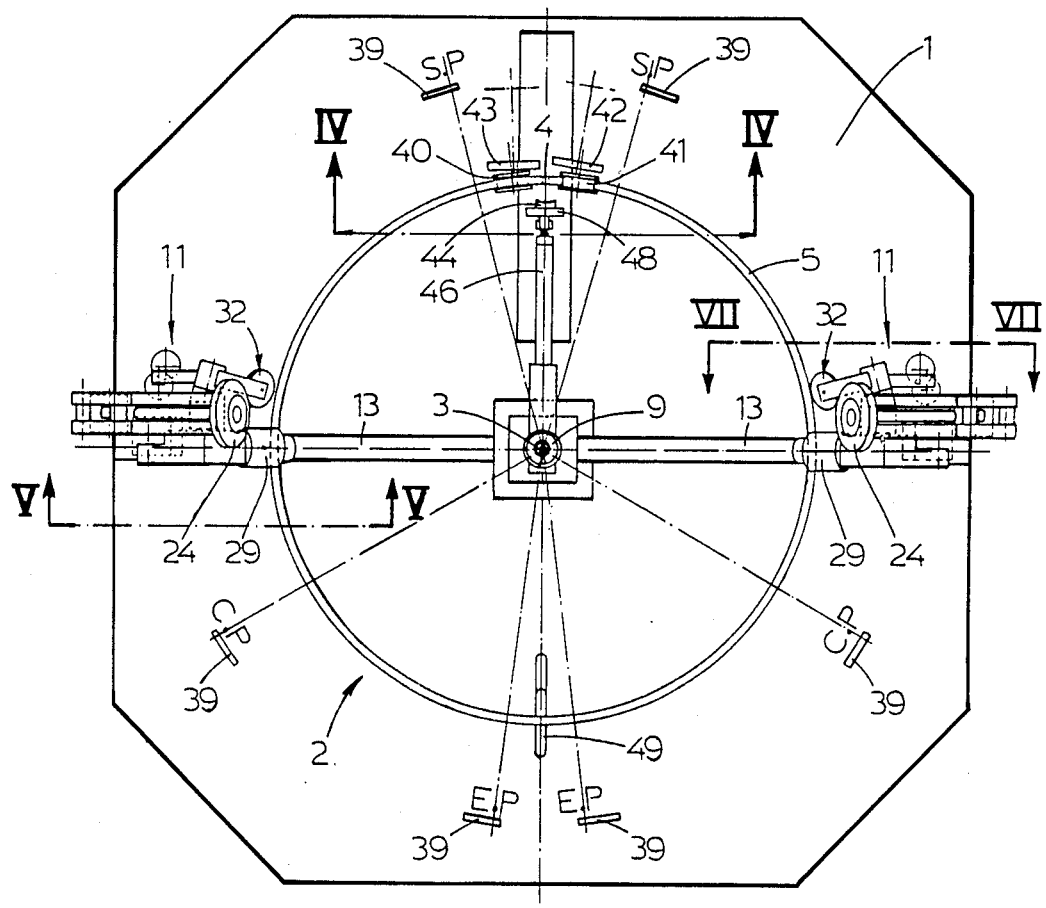
FIG. 1 is a plan view of an embodiment of the apparatus according to the invention.
Figure 3:
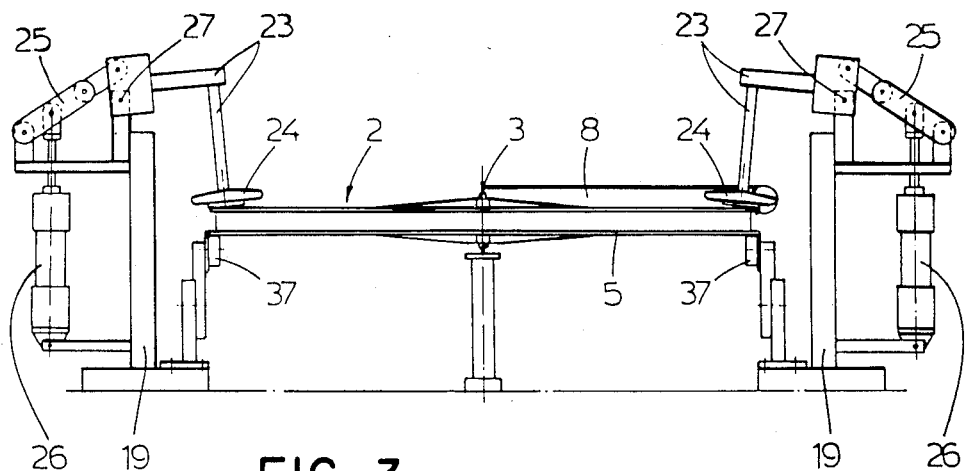
FIG. 3 shows a portion of the front view of FIG. 2, wherein the inner bead rolls are represented in their work position.

FIGS. 1 and 3 show a valve connection 44 within the circumference of the wheel rim 5, which valve connection 44 is mounted on an arm 46 through a support 45, the arm 46 being rotatable about the central axis 10. A compressed air line for inflating the inner tube extends from the valve connection 44 through the arm 46 to the central axis 10, whereafter this line is led via the hollow shafts of the crown gears 17 to a compressed air connection 47, to which a hose of a compressed air installation can be connected. Directly behind the valve connection 44 a positioning cam 48 with inclined upper faces is provided, on which wheel spokes lying on either side of the valve rest when the tire 8 is laid around the wheel rim 5.

A rim support 49 for supporting the wheel rim 5 is mounted on the table at the circumference of the wheel 2 diametrically opposed to the tire centering rolls 42, 43.

All parts which have to engage the wheel 2, such as the mounting units 11, the valve connection 44, the rim support roll 40, the rim clamping roll 41 and the tire centering rolls 42, 43 are adjustable in the radial direction so as to be adaptable to the diameter of the wheel rim 5.

The method for laying an outer tire 8 around a wheel rim 5 by means of the apparatus described hereinbefore is as follows:

Prior to the steps of laying the outer tire 8 around the wheel rim 5 the mounting units 11 are in their starting positions at either side of the tire centering rolls 42, 43. In FIG. 1 these positions are indicated by dot and dash lines marked with SP. All the rolls 24, 29, 41, 43 which can be placed on the outer tire 8 are in their upwardly pivoted positions, while the sliding members of the pinching-sliding means are open and the tire lifting arms 20 are in their lowest position.

The apparatus is inclined in the direction of the operator and the inclination is preferably approximately 45°, so as to make it possible to put in and take out the wheel 2 in the most advantageous way.

A wheel 2 already comprises an inner tube and an outer tire 8. The inner bead of the outer tire 8 is already locally urged over the upper rim edge in the vicinity of the valve hole 4 in the wheel rim 5, whilst the valve of the inner tube is already fixed in the valve hole 4 and the inner tube lies completely in the interior of the outer tire 8. To obtain this latter condition the inner tube is inflated to a starting pressure $p_s$.

a. First of all, the wheel 2 is placed in the apparatus in such manner that the valve is inserted in the valve connection 44 and the wheel shaft 3 falls into the cavity in the hub support 9. In order to enable the valve to be placed in the valve connection 44 in a simple way, the positioning cam 48 is provided directly behind the valve connection 44, so that the spokes lying on either side of the valve have to be moved downwardly along the positioning cam 48. Hereby the valve is automatically positioned in front of the valve connection 44. After the wheel 2 is placed in the apparatus, it not only rests with the shaft 3 on the hub support 9 but also with the wheel rim 5 on the rim support 49.

b. Then the rim clamping roll 41 is lowered on the wheel rim 5, so that the wheel rim 5 is urged downwardly on the rim support rolls 37, 40. On the other hand, the outer tire 8 is pushed upwardly by the tire lifting arms 20 of the mounting units 11, so as to create space between the outer bead of the outer tire 8 and the upper rim edge. The inner bead rolls 24 are then pivoted to their work positions, whereby the inner bead rolls 24 are partly inserted into the interior of the outer tire 8, which interior has been released by the tire lifting arms 20 and the inner bead rolls 24 are urged with their lower side on the wheel rim 5 (see FIG. 3).

c. Thereupon the apparatus is switched on, and the tire lifting arms 20 are moved downwardly, whereafter the arms 13 with the mounting units 11 provided thereon are driven by the motor 15, whereby the mounting units are transported with equal speeds but in opposite directions through an angle of substantially 180° along the wheel rim 5, whilst the inner bead rolls 24 over the wheel rim 5, whereby the inner bead of the outer tire 8 is urged over the upper rim edge of the wheel rim 5.

d. In the end positions, indicated in FIG. 1 by dot and dash lines marked with EP, the mounting units 11 stop and the inner bead rolls 24 are lifted off the wheel rim 5, whereafter the arms 13 are driven by the motor 15 in the opposite direction to their starting positions SP.

e. In this position the sliding members 32 of the pinching-sliding means are placed against the outer tire 8, and the sliding members 32 urge the outer bead and the inner bead of the outer tire 8 locally into the rim bed. In this way the outer bead is thereby pushed locally over the upper rim edge whereupon the outer bead rolls 29 can be placed on the free portion of the upper rim edge. The outer bead rolls 29 each rest with the smallest cylindrical portion on the spoke side of the upper rim edge, while the face between both cylindrical portions of the outer bead rolls 29 pushes on the opposite side of the upper rim edge.

f. The mounting units 11 are again transported with equal speeds but in opposite directions along the wheel rim 5 through an angle of substantially 180° to their end positions EP, wherein, on the one hand, the outer bead rolls 29 roll over the upper rim edge and thereby urge the outer bead of the outer tire 8 over the upper rim edge, whilst, on the other hand, the wheels 34 of the sliding means 32 roll over the respective flanks of the outer tire 8.

Because at each sliding means 32 the brake lining 53 is urged against the wheel 34 by means of the coil spring 56 a braking action is exerted on the wheel 34 as a result of the friction between the brake lining 53 and the wheel 34. In this way the wheel 34 will stress the outer tire 8 in the circumferential direction, whereby the outer bead of the outer tire 8 can be more easily urged over the upper rim edge by the outer bead rolls 29, whilst furthermore the inner bead and the outer bead are pinched together in the rim bed. The friction between the brake linings 53 and the respective wheel 34 is very uniform, so that the stressing action of the outer tire 8 takes place in a very controlable way.

The displacement of the mounting units 11 stops, when they have reached their end positions and the outer tire 8 is completely laid over the wheel rim 5. The steps of laying the tire around hereby have ended, and hereupon the step of centering the tire will follow, wherein the outer bead of the outer tire 8 has to be positioned straightly in the rim bed.

g. In the end positions EP of the mounting units 11 the action of inflating the inner tube starts. The action of inflating takes place by means of compressed air supplied to the compressed air connection 47, which compressed air is pumped into the inner tube through the valve connection 44, which has been turned along with the valve. When the tire is being inflated, the mounting units 11 are removed again in the direction of their starting positions SP. The mounting units 11, however, stop before they have reached this position SP and they will stop in their tire centering positions, which are preferably at 120° from their starting positions SP and which are indicated in FIG. 1 by the dot and dash lines marked with CP. Both sliding members 32 are then removed from the outer tire 8 and meanwhile the end pressure of the inner tube has been reached.

h. Thereupon the upper tire centering roll 43 is placed against the outer tire 8, whereby the outer tire 8 is clamped between both tire centering rolls 42, 43. The driving of the tire centering rolls 42, 43 is started, so that these tire centering rols 42, 43 drive the wheel 2 and cause the wheel 2 to rotate preferably for one turn. Because the tire centering rolls 42, 43 respectively, are positioned in a way as described hereinabove, when the wheel 2 is driven by the tire centering rolls 42, 43, a force with a radial component will be exerted on the tire at each tire centering roll 42, 43, which radial component will be directed inwardly or outwardly, dependent on the direction of rotation of the tire centering rolls 42, 43. During the first rotation, an outwardly directed force will be generated on the outer tire 8, whereby the outer tire 8 is slightly pulled out of the wheel rim 5. After this rotation, the driving action of the tire centering rolls 42, 43 is interrupted and the direction of driving is reversed, so that when the wheel 2 is driven again, it will rotate in the opposite direction and therefore an inwardly directed force is exerted on the outer tire 8 by each tire centering roll 42, 43, whereby the outer tire 8 is urged into the wheel rim 5. Because of this centering step, the outer tire 8 will be laid straightly in the rim bed and a wobbling of the outer tire 8 in the wheel rim 5 will be avoided.

i. After this centering step, the outer bead rolls 29, which served as a guide for the rotation of the wheel 2 during the centering, as well as the upper tire centering roll 42 are lifted off the outer tire 8, whereafter the mounting units 11 are moved back to their starting positions SP by the motor 15.

After the rim clamping roll 41 has been removed from the wheel 2 the steps of laying the outer tire 8 around the wheel rim 5 have been completed and the wheel 2 including the applied tire can be taken from the apparatus.

The method described hereinbefore can also be used partly. The actions according to the steps (a) to (d) can be done by hand so that the inner bead of the outer tire 8 is already placed on the wheel rim 5 before the wheel 2 is placed in the apparatus. Of course, a more simple apparatus can be used for this latter method.

According to this invention, a method and an apparatus are provided for laying a pneumatic tire around a wheel rim, wherein the several steps are almost fully automatized. The apparatus according to the invention therefore is very suitable for computer control.

The invention is not restricted to the embodiment shown in the drawings by way of example, which can be varied in different ways within the scope of the invention.

We claim:

1. A method for laying a pneumatic tire around a wheel rim by means of at least one pair of mounting units, comprising the steps of:

bringing sliding members of a pinching sliding means of each mounting unit into engagement with both flanks of the tire, whereby the outer bead of the tire is locally urged over the adjacent rim edge;

placing an outer bead roll of each mounting unit against the rim edge;

moving the mounting units with equal speeds along the wheel rim in opposite directions through angles, which together form an angle of substantially 360 degrees thereby urging the remaining portions of the outer bead over the adjacent rim edge by rolling the outer bead rolls over said rim edge while stressing the tire with the pinching sliding means in a circumferential direction as a result of a braking action which is exerted on the tire by said sliding members, and simultaneously pinching the tire together and laying the tire in the rim bed;

inflating the assembled tire thereby bringing tire centering rolls into contact with the opposite flanks of the tire, rotating the wheel rim for at least one turn in each way and positioning the tire centering rolls with respect to the tire in such manner that, during the rotation in one way, a friction force with an outwardly directed radial component is exerted on the tire by the tire centering rolls, whereby the tire is slightly pulled out of the wheel rim, and during the rotation in the other way, a friction force with an inwardly directed radial component is exerted on the tire by the tire centering rolls, whereby the tire is urged into the wheel rim.

2. A method for laying a pneumatic tire around a wheel rim by means of at least one pair of mounting units, comprising the steps of:

pushing an outer bead of the tire away from the adjacent rim edge, thereby creating a space between the outer bead and the adjacent rim edge, partly bringing an inner bead roll of each mounting unit into the interior of the tire and pushing said inner bead against the rim edge lying adjacent to the inner bead of the tire, moving the mounting units along the wheel rim to urge the inner bead over the adjacent rim edge, bringing sliding members of a pinching sliding means of each mounting unit into engagement with both flanks of the tire, whereby the outer bead of the tire is locally urged over the adjacent rim edge;

placing an outer bead roll of each mounting unit against the rim edge;

moving the mounting units with equal speeds along the wheel rim in opposite directions through angles, which together form an angle of substantially 360 degrees, thereby urging the remaining portions of the outer bead over the adjacent rim edge by rolling the outer bead rolls over said rim edge while stressing the tire with the pinching sliding means in a circumferential direction as a result of a braking action which is exerted on the tire by said sliding members, and simultaneously pinching the tire together and laying the tire in the rim bed.

3. Apparatus for laying a pneumatic tire around a wheel rim of a spoke wheel, comprising:

a table having means for supporting the spoke wheel in the apparatus;

at least one pair of mounting units movably connected to said table, the mounting units being movable with equal speeds in opposite directions along the wheel rim and together covering an angle of substantially 360 degrees;

each mounting unit comprising a central support;

an outer bead roll rotatably mounted on an arm which is movably connected to the central support, the outer bead roll serving for laying the outer bead of the tire around the wheel rim;

a pinching sliding means having two adjustable sliding members connected to the central support with one of said sliding members being positioned at a distance above the other of said sliding members, each of said sliding members being provided with an arm with at its free end carries a braked wheel adapted to engage the tire, each braked wheel being brakable by a brake lining disposed on the free end of the arm and urged against said wheel, the braked wheels engaging the tire at opposite flanks of the tire so as to stress the tire in the circumferential direction and to pinch the tire in the rim bed when the outer bead of the tire is being laid around the wheel rim by the outer bead rolls.

4. An apparatus as claimed in claim 3, wherein the brake lining can be urged against the braked wheel by means of a coil spring which is positioned between the brake lining and the arm of the sliding member, and the brake lining is locked against rotation.

5. Apparatus for laying a pneumatic tire around a wheel rim of a spoke wheel, comprising:

a table having means for supporting the spoke wheel in the apparatus;

at least one pair of mounting units movably connected to said table, the mounting units being movable with equal speeds in opposite directions along the wheel rim and together covering an angle of substantially 360 degrees;

each mounting unit comprising a central support;

an outer bead roll rotatably mounted on an arm which is movably connected to the central support, the outer bead roll serving for laying the outer bead of the tire around the wheel rim;

a pinching sliding means having two adjustable sliding members connected to the central support with one sliding member positioned at a distance above the other sliding member, said sliding members including means for engaging opposite flanks of the tire and for stressing the tire in the circumferential direction and to pinch the tire in the rim bed when the outer bead of the tire is being laid around the wheel rim by the outer bead rolls;

tire centering rolls provided on said table, said tire centering rolls engaging the tire on the opposite flanks, the tire centering rolls being positioned so that they each make a small angle to the tangent of the wheel rim, which tangent extends through the point of the wheel rim lying closest to the center of the respective tire centering roll.

6. An apparatus as claimed in claim 5, wherein at least one tire centering roll can be driven by a motor connected to said at least one tire centering roll.

7. An apparatus as claimed in claim 5, wherein at least one of the tire centering rolls are mounted on said table so as to be movable to and from the tire by means of an adjusting motor which is connected to said at least one movable tire centering roll.

8. Apparatus for laying a pneumatic tire around a wheel rim of a spoke wheel, comprising:

a table having means for supporting the spoke wheel in the apparatus;

at least one pair of mounting units movably connected to said table, the mounting units being movable with equal speeds in opposite directions along the wheel rim and together covering an angle of substantially 360 degrees;

each mounting unit comprising a central support;

an outer bead roll rotatably mounted on an arm which is movably connected to the central support, the outer bead roll serving for laying the outer bead of the tire around the wheel rim;

a tire lifting arm for pushing the outer bead of the tire away from the rim in the not applied condition of the tire;

a pinching sliding means having two adjustable sliding members connected to the central support with one sliding member positioned at a distance above the other sliding member, said sliding members including means for engaging opposite flanks of the tire and stressing the tire in the circumferential direction and to pinch the tire in the rim bed when the outer bead of the tire is being laid around the wheel rim by the outer bead rolls.

9. An apparatus as claimed in claim 8, wherein the tire lifting arm is hingedly connected to the central support and one end thereof can be pushed against the flank of the tire adjacent to the inner bead, the other end of the tire lifting arm being hingedly connected to an adjusting motor.

10. Apparatus for laying a pneumatic tire around a wheel rim of a spoke wheel, comprising:

a table having means for supporting the spoke wheel in the apparatus;

at least one pair of mounting units movably connected to said table, the mounting units being movable with equal speeds in opposite directions along the wheel rim and together covering an angle of substantially 360 degrees;

each mounting unit comprising a central support;

an outer bead roll rotatably mounted on an arm which is movably connected to the central support, the outer bead roll serving for laying the outer bead of the tire around the wheel rim;

a pinching sliding means having two adjustable sliding members connected to the central support with one sliding member positioned at a distance above the other sliding member, said sliding members including means for engaging opposite flanks of the tire and for stressing the tire in the circumferential direction and to pinch the tire in the rim bed when the outer bead of the tire is being laid around the wheel rim by the outer bead rolls;

each mounting unit being provided with a rim support roll which is rotatably mounted on a rod.

11. Apparatus for laying a pneumatic tire around a wheel rim of a spoke wheel, comprising:

a table having means for supporting the spoke wheel in the apparatus;

at least one pair of mounting units movably connected to said table, the mounting units being movable with equal speeds in opposite directions along the wheel rim and together covering an angle of substantially 360 degrees;

each mounting unit comprising central support;

an outer bead roll rotatably mounted on an arm which is movably connected to the central support, the outer bead roll serving for laying the outer bead of the tire around the wheel rim;

a pinching sliding means having two adjustable sliding members connected to the central support with one sliding member positioned at a distance above the other sliding member, said sliding members including means for engaging opposite flanks of the tire and for stressing the tire in the circumferential direction and to pinch the tire in the rim bed when the outer bead of the tire is being laid around the wheel rim by the outer bead rolls;

an inflating device connected to a valve connection, said valve connection being mounted to an arm connected to a support mounted on said table, said valve connection contacting a valve of a tire placed on said table, said arm being rotatable about a central axis of said apparatus.

12. An apparatus as claimed in claim 11, wherein a positioning cam is mounted on said arm near the valve connection for positioning a valve of the pneumatic tire in front of the valve connection.

13. An apparatus as claimed in claim 12, wherein the positioning cam is mounted on said arm directly behind the valve connection and comprises two inclined upper surfaces on which spokes disposed on either side of the valve can be placed.

14. Apparatus for laying a pneumatic tire around a wheel rim of a spoke wheel, comprising:

a table having means for supporting the spoke wheel in the apparatus;

at least one pair of mounting units movably connected to said table, the mounting units being movable with equal speeds in opposite directions along the wheel rim and together covering an angle of substantially 360 degrees;

each mounting unit comprising a central support;

an outer bead roll rotatably mounted on an arm which is movably connected to the central support, the outer bead roll serving for laying the outer bead of the tire around the wheel rim;

a pinching sliding means having two adjustable sliding members connected to the central support one at a distance above the other, said sliding members having a means to engage opposite flanks of the tire so as to stress the tire in the circumferential direction and to pinch the tire in the rim bed when the outer bead of the tire is being laid around the wheel rim by the outer bead rolls;

rim rolls mounted on the table and spaced from each other so that the rim rolls are positioned on either side of the wheel rim when the wheel rim is placed on the table, of which a first rim roll at the side of the rim edge adjacent to the outer bead of the tire is movable to and from the wheel rim by means of an adjusting motor connected to said first rim roll to clamp or release the wheel, respectively.

15. An apparatus as claimed in claim 14, wherein at least one rim roll can be driven by a motor connected to said at least one rim roll.

* * * * *